(12) United States Patent
Wideman et al.

(10) Patent No.: US 8,650,228 B2
(45) Date of Patent: Feb. 11, 2014

(54) METHODS AND SYSTEMS FOR SPACE MANAGEMENT IN DATA DE-DUPLICATION

(76) Inventors: Roderick B. Wideman, Shakopee, MN (US); Stephen Philip Lord, Prior Lake, MN (US); Jeffrey D. Leuschner, Rowlett, TX (US); Camden John Davis, Saint Paul, TX (US); John Theodore Kline, Apple Valley, MN (US); Douglas Alan Burling, Plano, TX (US); Joshua Fitzsimmons Martin, Murphy, TX (US)

( * ) Notice: Subject to any disclaimer, the term of this patent is extended or adjusted under 35 U.S.C. 154(b) by 1265 days.

(21) Appl. No.: 12/102,590

(22) Filed: Apr. 14, 2008

(65) Prior Publication Data

US 2009/0259701 A1  Oct. 15, 2009

(51) Int. Cl.
*G06F 12/00* (2006.01)
*G06F 12/02* (2006.01)

(52) U.S. Cl.
USPC ............. 707/813; 707/815; 707/E17.044; 711/E12.001; 711/E12.002

(58) Field of Classification Search
USPC .......................................... 707/813, 999.206
See application file for complete search history.

(56) References Cited

U.S. PATENT DOCUMENTS

| | | | |
|---|---|---|---|
| 6,209,003 B1 | 3/2001 | Mattis et al. | |
| 6,493,730 B1 | 12/2002 | Lewis et al. | |
| 7,685,083 B2* | 3/2010 | Fairweather | 706/45 |
| 2004/0167945 A1* | 8/2004 | Garthwaite | 707/206 |
| 2006/0022800 A1* | 2/2006 | Krishna et al. | 340/10.2 |
| 2008/0010327 A1 | 1/2008 | Steensgaard et al. | |
| 2008/0071992 A1 | 3/2008 | Chetuparambil et al. | |
| 2009/0178059 A1* | 7/2009 | Lang et al. | 719/318 |

OTHER PUBLICATIONS

Patent Cooperation Treaty (PCT) International Search Report from co-pending PCT International Patent Application No. PCT/US2009/040311, International Filing Date: Apr. 13, 2009, having a mailing date of Nov. 13, 2009.

* cited by examiner

*Primary Examiner* — Shyue Jiunn Hwa (57) ABSTRACT

The present invention is directed toward methods and systems for data de-duplication. More particularly, in various embodiments, the present invention provides systems and methods for data de-duplication that may utilize storage reclamation. In various embodiments, data de-duplication may be performed using data storage reclamation by reconciling a list of all active tags against a list of all tags present within the object store itself. Any tags found to be in the object store that have no corresponding active usage may then be deleted. In some embodiments additional steps may be taken to avoid race conditions in deleting tags that are needed by incoming data. In some embodiments the object store may request the lists. In other embodiments, a runtime list, in which each new tag is entered as they are returned from the object store. In another embodiment the object store may maintain this list directly.

10 Claims, 6 Drawing Sheets

|  | BFST Tag List File (tags) | BFST Object Store Content (tags) | Active (Meta Dump) Tag List |  |  |
|---|---|---|---|---|---|
| Time 0 | empty | Empty |  |  |  |
| Time 1 | empty | 1 & 2 |  | File A created and given tag of 1, File B created and given a tag of 2 |  |
| Time 2 | empty | 1, 2 & 3 |  | File B is removed, File C stored and given tag 3 |  |
| Time 3 | 1, 2 & 3 | 1, 2 & 3 | 1 & 3 | Empty & generate BFST tag list and active tag list Then compare the 2 lists. | Garbage Collection Occurs |
| Time 3.5 |  | 1 & 3 |  | Delete tag 2 based on compare |  |
| Time 4 |  | 1, 3, 4 & 5 |  | File D created and given tag of 4. File A is removed. File E is created and given tag of 5 |  |
| Time 5 | 1, 3, 4 & 5 | 1, 3, 4 & 5 | 3, 4 & 5 | Empty & generate BFST tag list and active tag list Then compare the 2 lists.. | Garbage Collection Occurs |
| Time 5.5 |  | 3, 4 & 5 |  | Delete tag 1 based on compare |  |

FIG. 5

|  | Box A | | | Rep Box | | | | |
|---|---|---|---|---|---|---|---|---|
|  | BFST Tag List File (tags) | BFST Object Store Content (tags) | Active (Meta Dump) Tag List | BFST Tag List File (tags) | BFST Object Store Content (tags) | Active (Meta Dump) Tag List | | |
| Time 0 | empty | empty |  | empty | empty |  |  |  |
| Time 1 | empty | 1 & 2 |  | empty | 1 & 2 |  | File A created and give tag of 1, File B created and give a tag of 2, Tags 1 & 2 SRemoted across and stored |  |
| Time 2 | empty | 1, 2 & 3 |  | empty | 1, 2 3 &400 |  | File B is removed, File C stored and given tag 3, Tag 3 SRemoted across and stored, file D1 created, stored and given tag of 400 |  |
| Time 3 | empty | 1, 2 & 3 |  | 1, 2 3 & 400 | 1, 2 3 &400 | 400 | On Rep Box BFST Tag List emptied and generated. Active Tag List emptied & generated from Local meta dump. Box A name space replication has not occured so processing waits. | Garbage Collection Occurs on RepBox |
| Time 4 | empty | 1, 2 & 3 |  | 1, 2 3 & 400 | 1, 2 3 &400 | 400 | Box A: File A is removed |  |
| Time 5 | empty | 1, 2 & 3 | 3 (to Rep Box) | 1, 2 3 & 400 | 1, 2 3 &400 | 400 | Box A generates MetaDump Tag List and sends to RepBox | Replication occurs on BoxA |
| Time 6 | empty | 1, 2 & 3 |  | 1, 2 3 & 400 | 1, 2 3 &400 | 400, 3 | Meta Dump Tag List & Box A Meta Dump Tag List combined and compared to Tag List File to find that 1 & 2 should be deleted. | Garbage Collection continues |
| Time 6.5 | empty | 1, 2 & 3 |  |  | 3 & 400 |  | Remove 1 & 2 |  |

FIG. 6

METHODS AND SYSTEMS FOR SPACE MANAGEMENT IN DATA DE-DUPLICATION

FIELD OF THE INVENTION

The present invention relates generally to data processing systems and more particularly, some embodiments relate to methods and systems for performing data de-duplication and data storage reclamation.

BACKGROUND OF THE INVENTION

Vast amounts of electronic information are stored, communicated, and manipulated by modern computer systems. Much of this vast amount of electronic information is duplicated. For example, duplicate or near duplicate copies of data may be stored on a hard drive or hard drives, communicated across a communication channel, or processed using a computer or other electronic device. This duplicated data might be used in many different applications and on many different electronic systems. Accordingly, data de-duplication technology may impact a broad range of applications.

Data de-duplication is a method of reducing or eliminating redundant files, blocks of data, etc. In this way, a data de-duplication system attempts to ensure that only unique data is stored, transmitted, processed, etc. Data de-duplication is also sometimes referred to as capacity optimized protection. Additionally, data de-duplication may address rapidly growing capacity needs by reducing electronic information storage capacity required, transmission capacity, processor capacity, etc.

In one example of how duplicate data might exist on a computer network, an employee may email a Word® attachment to 25 co-workers. On some systems, a copy is saved for every employee the file was sent to, increasing the capacity requirement of the file by a factor of 25. In some cases data de-duplication technology may eliminate the redundant files, replacing them with "pointers" to the original data after it has been confirmed that all copies are identical. This example illustrates data de-duplication at the file level. Data de-duplication may also be implemented based on variable size blocks of data. In other words, redundant variable sized blocks of data may be eliminated by replacing these blocks with a pointer to another instance of a matching block of data.

In some cases, data duplication might occur in a data storage system. For example, archived electronic information such as electronic documents, files, programs, etc. exist on backup tapes, backup hard drives, and other media. In many cases a computer may store a large number of files, which in some cases may be duplicates of the same file or document, slightly differing versions of the same document, etc. Accordingly, duplicates or near duplicates might exist for many different types of files, including documents, graphic files, and just about any other type of computer file.

Additionally, duplication might occur when data is communicated. In computer-based systems it is common for a computer to transmit one or more files over a computer network or other communication system to, for example, other computers in the computer network. This network may be wired, wireless, or some combination of the two. Additionally, the network may use just about any computer data communication system to transmit the data.

Different types of duplication might exist. In one type, a file or files may be repeatedly transmitted by a computer. For example, it is common for data transmitted during a backup operation to be almost identical to the data transmitted during the previous backup operation. Accordingly, a computer, computer networks, etc. might also repeatedly communicate the same or similar data.

In another type of duplication, a duplicate or near duplicate file or files, such as duplicate or near duplicate document, graphic files, etc. might be stored on a computer system. In other words, multiple copies of a file might exist, as in the emailed document example. Accordingly, different types of file de-duplication systems and methods might address various types of duplication. Some types of data de-duplication systems and methods might relate to file duplication or near duplication that involves multiple copies of the same or similar files sent during the same transmission. Other types of data de-duplication systems and methods may relate to file duplication that involves the same or similar files sent during a series of transmissions. Yet other types of data de-duplication might relate to both types of file duplication or near duplication.

Data de-duplication might include both transmission for backup and the backup itself. For example, some data de-duplication systems may transmit only data that has changed since a previous backup. This data might be stored on a daily basis or perhaps a weekly basis. In some systems these changes in the data might be what is saved, for example, on a backup drive, disc, tape, etc. For example, a backup system might initially transmit a "full backup" for example, all files in a directory or series of directories, all files on a disc or on a computer, all files on all disks on an entire network, etc. The full backup might simply be any files that a particular user selects for backup. The data for the full backup may be transmitted and stored using various communication and storage systems. After the full backup, subsequent backups might be based on only files that have changed. These might be the only files subsequently transmitted, stored or both. Of course, a user might also select to do a full backup from time to time after the initial full backup.

Systems that only make full backups might be required to store a large amount of data. This may increase the expenses associated with these types of systems due to, for example, the cost of additional hard drives, tape media, data CD's or DVD's, wear on disc drives, CD or DVD drives, tape drives, etc. Accordingly, incremental systems might be more efficient in terms of data storage, mechanical wear on system components, etc.

There are two main types of de-duplication. These methods are inline or offline. Inline de-duplication is performed by a device in the data path. This may reduce the disk capacity required to store electronic data thereby increasing cost savings. A disadvantage of inline de-duplication is that the data is processed while it is being transmitted for backup, which may slow down the backup process.

In contrast, offline data de-duplication does not perform the data de-duplication in the data path, but instead performs the process at the backup system. This may require more data storage capacity, such as, for example, disk capacity. Performance may, however, be improved by having the process reside outside of the data path, after the backup job is complete. In other words, because the data is processed after being transmitted for backup it generally will not slow the transmission of data down.

When data de-duplication technology is used to eliminate redundant sets of data the data de-duplication storage systems might typically store a single copy of data or portions of data, and then create references to these objects as the same data is encountered again. By using references to previously stored data, systems built upon these object stores can de-duplicate new data as it arrives to be stored. For example, a file system can present original files, but only retain the unique portions of data used to compose those files, with references substituted for duplicate occurrences.

Over time, however, the object store may contain unreferenced objects. In other words, over time every reference to a data object stored might be deleted such that the data object stored is no longer needed. For example, when all references to an object have been deleted there is no longer a need for a valid representation of the data object stored. The data comprising the object may continue to be stored, however. Unreferenced objects, data objects that continue to be stored when all references to the object have been deleted, still occupy storage space, and it is desirable to reclaim that space for use by new data objects.

It is generally undesirable to simply delete a data object whenever a reference to that object is deleted. The reference currently being deleted might not be the only reference to the object. Accordingly, the data object may still be needed, for example, if these other references are accessed. In some systems, deleting a data object whenever something that points to it is deleted may be prohibited because there may still be other active references to the object. These additional references may not be known by the process currently deleting its own use of the object, which further complicates the problem.

In a system that never or rarely deletes objects with multiple references, the storage device(s) may become so full with unreferenced data objects that large portions of data storage are unnecessarily consumed by unused data objects. Further, a system that does not delete any of the objects as the references change or are removed until a user removes the objects may become unusable until the manual intervention occurs. Accordingly, a system that lets the object store become populated and is manually emptied may become so full of unused data objects that it is not usable. While a storage device may from time to time become full, if some or all of this data is data that a user wishes to store, then the system is generally performing its function. If, on the other hand, most or a large percentage of the storage device is filled with unreferenced data objects, then the user will generally not have access to a large percentage of the storage space purchased.

BRIEF SUMMARY OF THE INVENTION

The present invention is directed toward methods and systems for data de-duplication. More particularly, in various embodiments, the present invention provides systems and methods for data de-duplication that may utilize storage reclamation.

In accordance with some embodiments of the systems and methods described herein, reclamation of data storage space may comprise generating a list of active tags that includes a tag used by a data object stored in an object store. In various embodiments, a list of tags associated with data objects present within an object store may be generated. The list of active tags may be compared to the list of tags associated with data objects present within the object store. A data object that is in the object store but for which its associated tag is not in the active tag list may be deleted.

In accordance with some embodiments, a reference count associated with a tag (or a data object) may be incremented based on the number of references to the tag and decremented based on the number of deletions of references to the tag. In this way a tag and the data object associated with the tag may be deleted when the reference count associated with the tag indicates that no references to the tag are active. Accordingly, tags and the data objects associated with tags with active references might not accidentally be deleted.

In accordance with some embodiments, further steps may be taken to avoid race conditions in deleting a tag or a data object associated to the tag that may be used again because, for example, the data associated with a tag matches data that is about to be saved. For example, in various embodiments, the deletion of a tag or data object associated with the tag may be delayed to determine if a reference to the tag is contained in the incoming data.

In accordance with various embodiments, the object store may comprise a data storage device such as, for example, a disk drive, a tape drive, a memory-based data storage device, etc. In some embodiments the object store might include a combination of data storage devices, such as multiple disk drives, tape drives, memory-based data storage devices, etc.

In some embodiments, reclamation of data storage space may occur as a background task. In various embodiments reclamation of data storage space may occur after a predetermined period of time has passed. In another embodiment, data reclamation may occur when the object store has a predetermined amount of data storage space available, for example, when the amount of data storage space available is low. For example, if the object store comprises a disk drive, data reclamation may occur when the disk drive is 75%, 85% or 95% full.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DESCRIPTION OF THE PREFERRED EMBODIMENTS

Various embodiments of the systems and methods described herein provide data de-duplication. For each block, hashes, Cyclic Redundancy Codes ("CRCs") or any other code that might represent a block may be calculated and stored. A hash or hash function is a reproducible method for converting one block of data into a number, known as a tag, that represents that block of data. The hash is generally smaller than the original block of data and might serve as a digital "fingerprint" of the block of data, or "tag". A CRC is a type of hash function that may be used to produce a checksum to detect errors in transmission or storage. Cryptographic strength hash functions may also be used, such as MD5 or SHA-1.

The first block of the set may be written normally and its address and tag can be stored and noted. Subsequent block hashes may be compared with previously written block hashes. An address of a block with a hash or CRC that matches a previously written block may be written to indicate the location of the previously written block. Alternatively, the hash, or other code might be written to indicate a previously written block. In this way, redundant data may be eliminated.

In accordance with some embodiments of the systems and methods described herein, reclamation of data storage space in a data de-duplication system may comprise generating a list of active tags that includes a tag used by a data object stored in an object store. In various embodiments, a list of tags present within an object store may be generated. In other embodiments, the list of tags present within an object store may be maintained as objects enter the object store. The list of active tags may be compared to the list of tags present within the object store. A tag that is in the object store but not in the active tag list may be deleted. Additionally, the data that the tag points to or represents might also be deleted.

Figure 1:
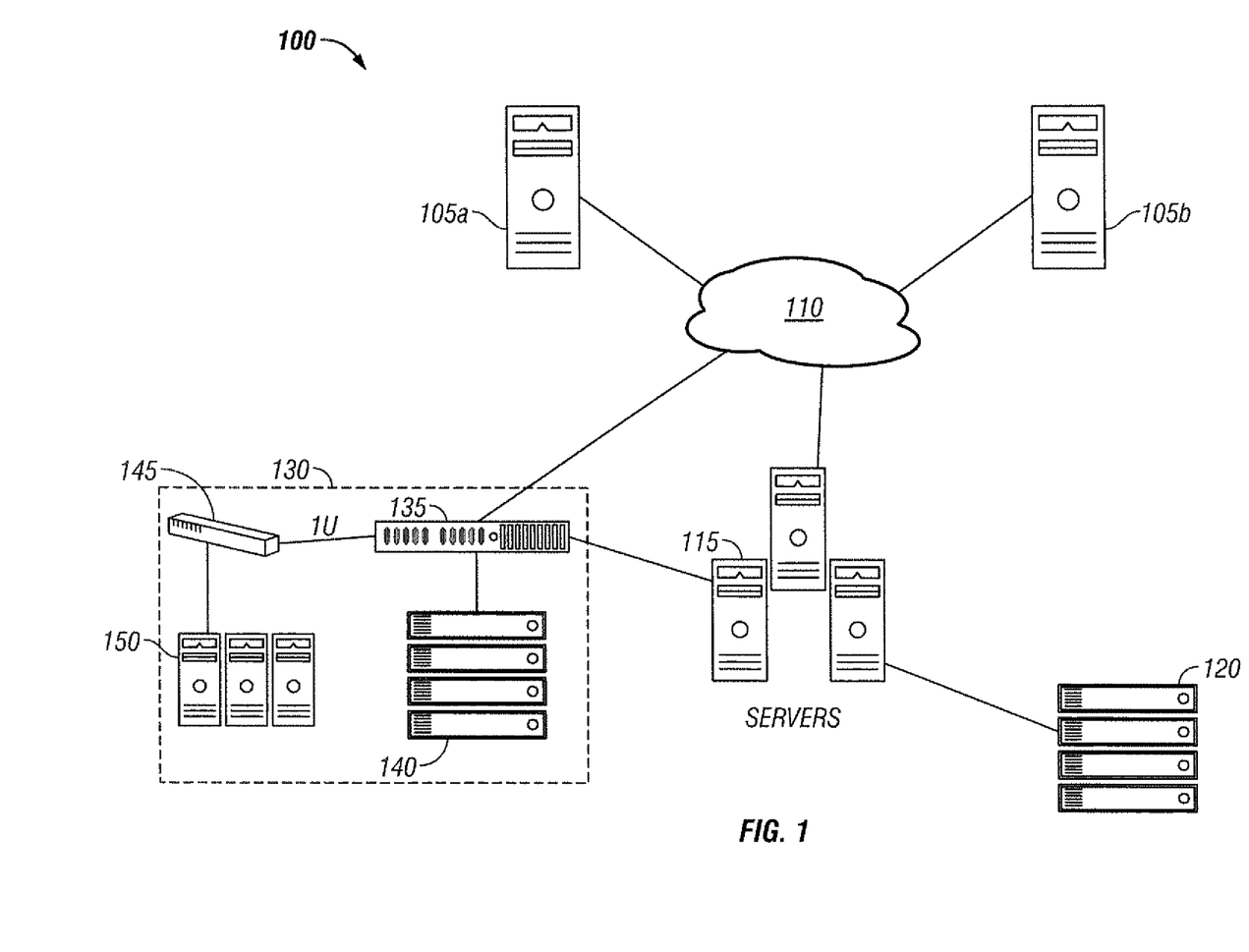
FIG. 1 is a block diagram illustrating one possible configuration of a network that can serve as an example environment in which the present invention can be implemented.

Before describing the invention in detail, it is useful to describe an example environment with which the invention can be implemented. FIG. 1 illustrates a data storage system 100 with which the present invention can be implemented. System 100 in the illustrated example includes computing devices 105*a-b,* a network 110, a server 115, an array of storage disks 120, and a storage area network 130. Computing devices 105*a-b* can be any of a variety of computing devices including, for example, laptops, desktops, workstations, personal digital assistants (PDAs), handheld computing devices, or other types of computing devices.

Network 110 can be implemented using any of a variety of network architectures or topologies. Such networks might include, for example, the internet, a local area network (LAN), a wide area network (WAN), a plain old telephone system (POTS), or any other suitable network or communications channel. In the illustrated example, computing devices 105*a-b* and server 115 are connected to network 110. The connection to network 110 can be wireless or through a wired connection.

Server 115 can be any server system such as, for example, a conventional standalone file server configured to provide data services to a client device such as device 105*a*. Server 115 can be scalable to increase storage capacity such as, for example, by adding storage disk array 120. Disk array 120 can be implemented as, for example, a direct-attached storage (DAS system). In the example architecture illustrated in FIG. 1, system 100 includes a storage pool 130, which includes switch 135, disk array 140, router 145, and a tape server 150. Server 115, disk array 120, and the storage pool 130 can be implemented using one or more types of storage architectures such as, for example, small computer system interface (SCSI), serial advanced technology attachment (SATA), serial attached SCSI (SAS), or fiber channel (FC).

With continued reference to FIG. 1, the illustrated exemplary system 100 can provide data access and storage redundancy by storing data at multiple locations such as server 115, disk arrays 120 and 140, or tape server 150. Server 115 can be groups of remote servers; each group may be locally or remotely connected with other groups via a network similar to network 110. As shown in FIG. 1, server 115 may access data or backup data to disk array 140 or tape server 150 through network 110 or via a direct connection to switch 135. In this way, server 115 has the flexibility of accessing array 140 or tape server 150 via multiple connections and thereby avoids network bottlenecks.

In various embodiments, switch 135 is an FC data switch and tape server 150 is SCSI type server. In this embodiment, router 145 is configured to transfer data between a FC data bus of FC switch 135 and a SCSI bus of SCSI tape server 150. Although a specific architecture is described above, components of the storage pool 130 may have a different architecture or combination of architectures such as, for example, SATA, SAS, and FC.

From time to time, the present invention is described herein in terms of this example environment. Description in terms of this environment is provided to allow the various features and embodiments of the invention to be portrayed in the context of an exemplary application. After reading this description, it will become apparent to one of ordinary skill in the art how the invention can be implemented in different and alternative environments.

In accordance with various embodiments of the systems and methods described herein, a data storage appliance, such as a backup appliance with data de-duplication and replication capability may include storage reclamation functionality. In various embodiments, the backup appliance might implement the reclamation functionality using the method illustrated in FIG. 2. The backup appliance may be a disk-based backup appliance, a tape-based backup appliance, or any other data de-duplication storage system that might use the systems and methods described herein in order to determine when to delete a tag for a block of data or when to delete a block of data that is not currently being used by any files stored on the device.

Figure 2:
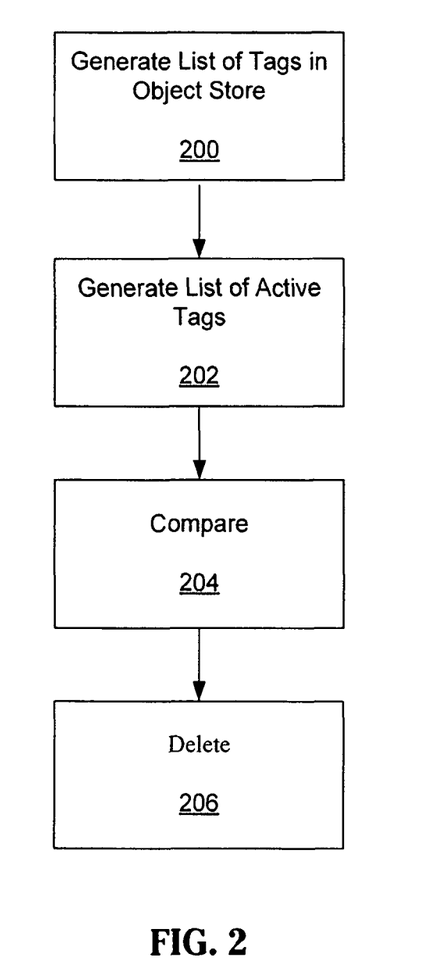
FIG. 2 is a flowchart illustrating an example method in accordance with various embodiments of the systems and methods described herein.

FIG. 2 is a flowchart illustrating an example method in accordance with various embodiments of the systems and methods described herein. Referring to FIG. 2, an example method of reclamation of data storage space in a data de-duplication system is illustrated. In a step 200, a list of tags in an object store may be generated. The object store may be, for example, disk storage space that contains various objects, such as data objects that may be associated with tags. The tags may be, for example, associated with blocks of data that might be part of one or more files. The list of tags in the object store generated in step 202 may include, for example, tags to various data blocks currently stored on a hard disk, tape drive, memory storage device, etc. In some embodiments, the list might include all tags to all data blocks currently stored on an array of disk drives, tape drives, memory storage devices, or an array of multiple types of storage devices, for example.

In a step 202, a list of active tags may be generated. The active tags may be, for example, pointers to data that is currently needed by one or more data files stored on a data storage system. As discussed above, data storage systems that use de-duplication may store, for example, a single instance of data that might be used by multiple files stored on the data storage system. As long as one of these multiple files needs the single instance of data, then that instance should not be deleted. By generating a list of active tags, the systems and methods described herein may determine which tags are needed so that tags and any associated data that are needed are not deleted.

It will be understood that in some embodiments multiple instances of the same data might be stored so that, for example, if a tag or data object associated with a tag on one part of a storage system is corrupted it might be retrieved using another tag. The systems and methods described herein may still be used in such systems to determine which tags stored in multiple locations might be deleted or which data associated with the tags might be deleted.

In a step 204, the list of active tags may be compared to the list of tags in the object store. In this way the systems and methods described herein may determine which tags and associated data, if any, are stored on a storage device that are not needed by any of the files stored on the storage device.

For example, in various embodiments, storage reclamation may be addressed by, reconciling a list of all active tags against a list of all tags present within the object store itself. In various embodiments, when reconciling the list of all active tags against the list of all tags present within the object store itself, any tags and associated data found to be in the object store that have no corresponding active usage may be deleted. If a tag is in the object store but is not being used by any files being stored in the backup appliance, then the tag may not be needed and might be deleted to, for example, allow the storage space to be used for other tags. Additionally, data associated with a tag that is in the object store but not being used by any file might also be deleted.

In some embodiments, further, steps may be taken to avoid race conditions in deleting tags and data that may be used again because, for example, the data is currently being saved. For example, the deletion of unneeded tags and associated data may lag the determination that the tags and data are no longer needed. Examples of additional steps that may be taken to avoid race conditions are discussed below.

In accordance with various embodiments, an application programming interface (API), may use the object store to request a list of tags present within the object store. In some cases, it may be advantageous for the systems and methods described herein to be self-contained to the object store. For example, by keeping the list self-contained, communication requirements between the disk-based backup appliance and other devices may be minimized. Additionally, the impact that the systems and methods described herein might have on other processors in, for example, a computer network may be minimized. In some examples, however, performance challenges might occur if the list is created on demand each time it is needed.

In accordance with another embodiment, a runtime list may be maintained. In various embodiments, each new tag may be entered as they are returned from the object store. In another embodiment, the object store may maintain the list directly. In some cases, this may avoid the need to create a new list on each request. It may, however, require additional storage. In various embodiments, this list may be built over time instead of all at once to improve performance. For each tag, its associated reference count (e.g., how many times it is pointed to) is also gathered.

In various embodiments, the list of all active tags may be generated by reviewing all active file system namespaces to compile a list of all tags used to represent the data stored to those namespaces. In some embodiments, a namespace snapshot might include this list as part of its metadata. Accordingly, each of these lists may be extracted from the metadata. In various embodiments, a namespace snapshot may be the result of a replication process and may be present only on systems that serve as replication targets. The namespace snapshots represent an active file system namespace In various embodiments, the namespace snapshots may be stored in the object store to further conserve space.

In various embodiments, once the list of tags present within the object store and the list of active tags are generated, they may be compared to each other. Tags that are in the object store but not in the list of active tags and the associated data may be deleted.

In some embodiments, instead of being directly deleted a counter might be maintained. For example, in various embodiments, a reference count might be based on the number of references to a tag. The reference count might be incremented whenever a new reference to a tag occurs and decremented when a reference to a tag is deleted. In various embodiments, a tag and its associated data might be deleted if the reference count associated with the tag is, for example, zero. In various embodiments, the deletion of the tag and the data associated with it might also be delayed to determine if a reference to the tag will occur based on in incoming data.

In various embodiments, a reference count may be decremented by the value of the reference count that was gathered when the list was compiled. This may facilitate store operations continuing that may increment the reference count. These store operations may occur, for example, either locally or via remote replication sources. In this way, tags may be kept active in the object store so that tags and the associated data are not deleted if they are used by data that is currently stored on a data storage device or data being written to the storage device.

In some embodiments, tags may be found in the list of active tags that are not in the list of tags from the object store. This may occur based on the order in which processing occurs. For example, in some embodiments, the system may get a list of tags from the object store. After that a new object may be created and stored. This may generate a new tag. After this the system may get a list of active tags. As will be understood, in this case the new tag would be in the list of active tags but not in the previously retrieved list of tags from the object store. Generally, these new tags will be found when space reclamation is processed again. Delays in storing data to an object store will not cause this data to be lost because, in some embodiments, tags in the object store that are not in the active tags list might be deleted but tags that are found in the list of active tags that are not in the list of tags from the object store, however, are not deleted because they are not in the object store list yet. In various embodiments, when a tag can be deleted, deleting the associated data will also generally be allowed because this data may not be needed.

Tags and associated data that are identified for deletion can either be deleted immediately, or a list can be generated periodically and the deletion process can take place later. For example, in various embodiments, deletion may be based on a schedule or event. In various embodiments, deletion of a tag may occur when a storage device is 80% full, for example, or after a predetermined time has passed.

In various embodiments, the space reclamation process may be invoked manually. For example, a user or system administrator might be required to run a disk space reclamation process program. In another embodiment, however, the systems and methods described herein might run automatically. For example, the reclamation of data storage space in a data de-duplication system might occur automatically based on a timer or other event such as a low space threshold.

In various embodiments, for example, to avoid race conditions when replication is active, the space reclamation process may run after all replication sources have completed their scheduled replication process. This may apply to systems used as a replication target, for example. A target replication system may be a data storage system that might be used to replicate other data storage systems. Additionally, this may apply only when these systems are performing such a replication. For example, in various embodiments, the replication target may track when each replication source has completed. When all replications are complete, space reclamation may be processed. In other embodiments, the space reclamation process may also run independently of replication processes.

Figure 3:
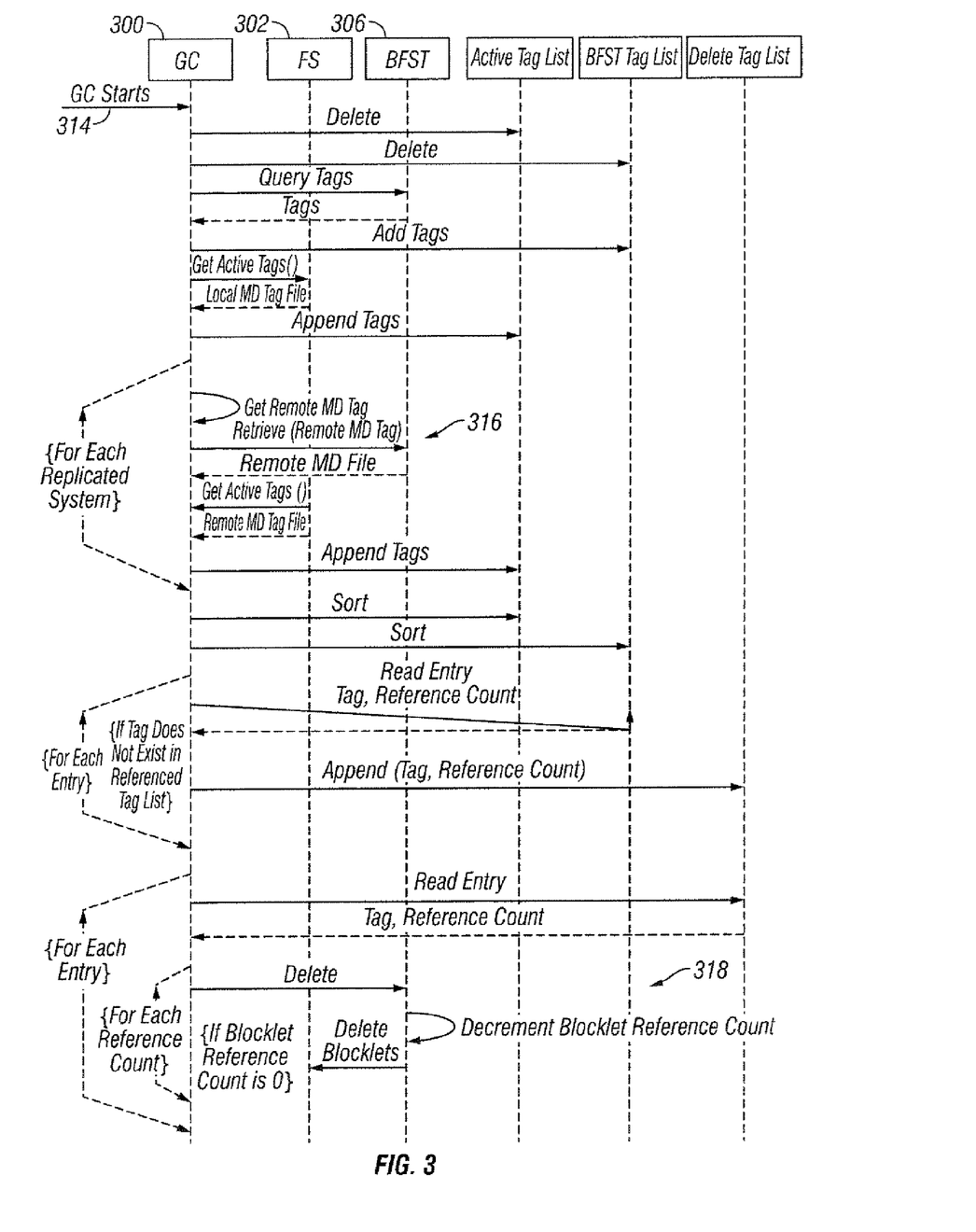
FIG. 3 is a diagram illustrating an example of data reclamation and de-duplication in accordance with various embodiments of the systems and methods described herein.

FIG. 3 is a diagram illustrating an example of data reclamation in accordance with various embodiments of the systems and methods described herein. Referring now to FIG. 3, an example method of reclamation of data storage space in a data de-duplication system is illustrated. Reclamation of data storage space may also be referred to as "garbage collection" or "GC" 300 in some examples. As illustrated in FIG. 3, garbage collection 300 might be implemented in conjunction with a file store (FS) 302 and blocklet file store (BFST) 306. Blocks of data, such as files, may be broken into smaller blocks or "blocklets."

In some embodiments, the blocklet file store (BFST) 306 may include, for example, a processor that breaks blocks of data into blocklets and further processes these blocklets. For example, the processor might be used to perform data de-duplication or other processing. A blocklet file store (BFST) 306 may be used to store blocklets and might include disk storage, tape storage, memory based storage, etc. For example, as illustrated in FIG. 3, blocklets may be stored in the blocklet file store 306. A tag to these blocklets might be communicated back and saved in the local file store.

As illustrated in FIG. 3, reclamation of data storage space (garbage collection) may include both local and remote components. For example, reclamation of data storage space may begin at 314 by getting local tags from a metadata tag file in file storage 302. Additionally, in some embodiments, remote tags might be retrieved 316 from the blocklet file store 306.

Contents such as, for example, local store data, tag lists, etc. might be sent to the local store list. In this way, the system may keep track of this information using the local store list. Additionally, contents, such as, for example, remote store data, tag lists, etc. might be sent to the remote store list. In some embodiments, both local store list and remote store list information might be added to a tag list.

In various embodiments, the garbage collection process 300 might get the contents of the BFST tag list, e.g., the tags and, as illustrated in FIG. 3, each BFST tag list tag that is not a part of the metadata tags may be deleted 318. In some embodiments, the BFST 306 may refer to a blocklet server and blocklet disk storage. A file system client provides a local file system that may contain, for example blocklets created by the blocklet processing engine.

Figure 4:
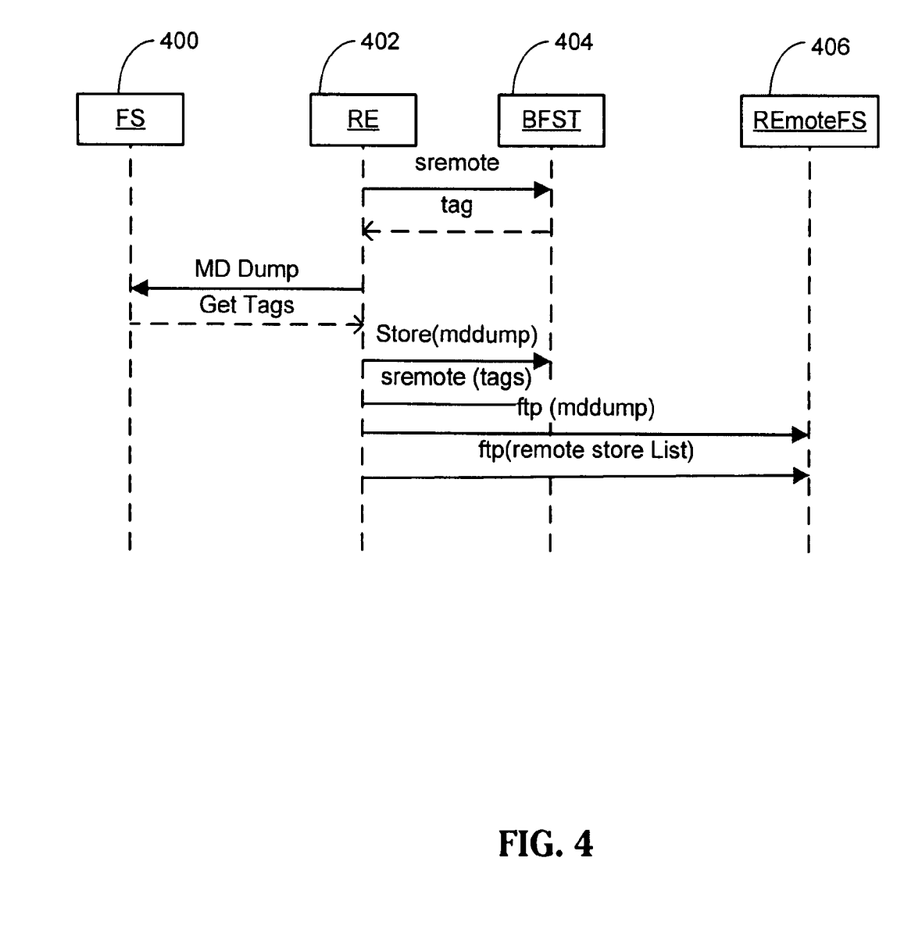
FIG. 4 is a diagram illustrating replication in accordance with various embodiments of the systems and methods described herein.

FIG. 4 is a diagram illustrating replication in accordance with various embodiments of the systems and methods described herein. In the example of FIG. 4, a remote block processing engine 402 might store data in a blocklet file store 404. Additionally, a tag might be returned to the block-processing engine 402 and the tag might also be stored in a remote store list 406.

In the embodiment of FIG. 4 metadata may be transmitted to a local file store 400. The remote replication processing might also get tags from the local file store 400. The metadata and tags may be stored in the block file store 404 or transferred to a remote file store 408 using, for example, file transfer protocol (ftp).

Figure 5:
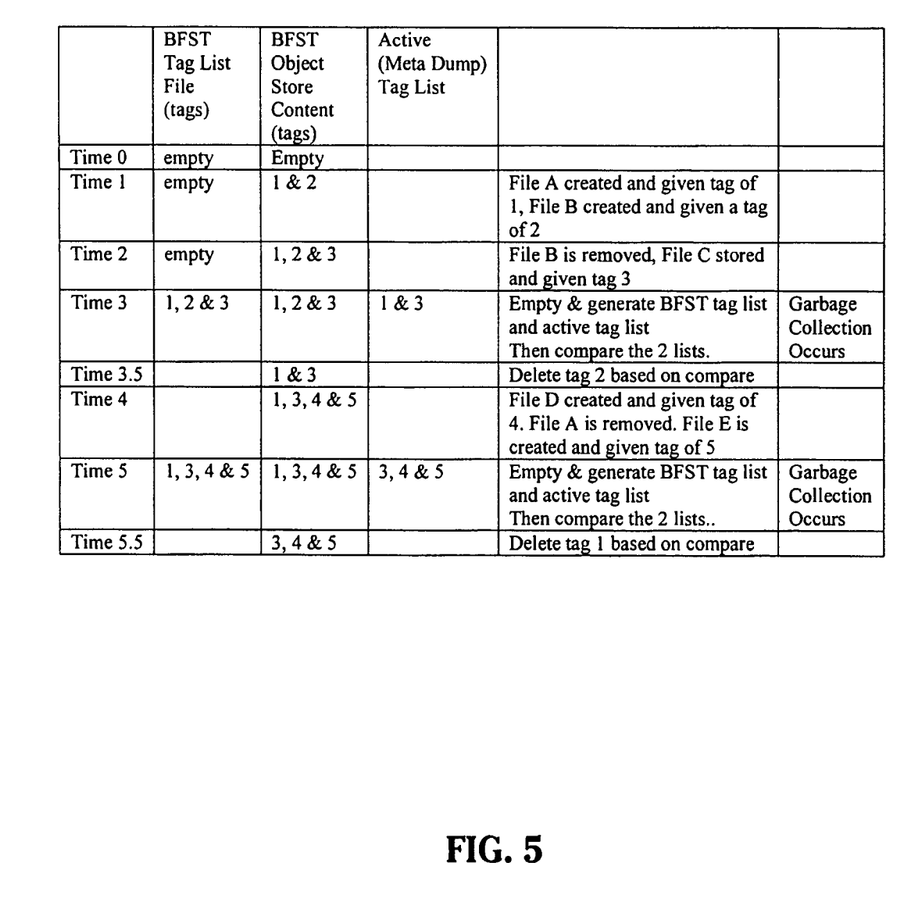
FIG. 5 is a table illustrating an example of data reclamation in accordance with the systems and methods described herein.
Figure 6:
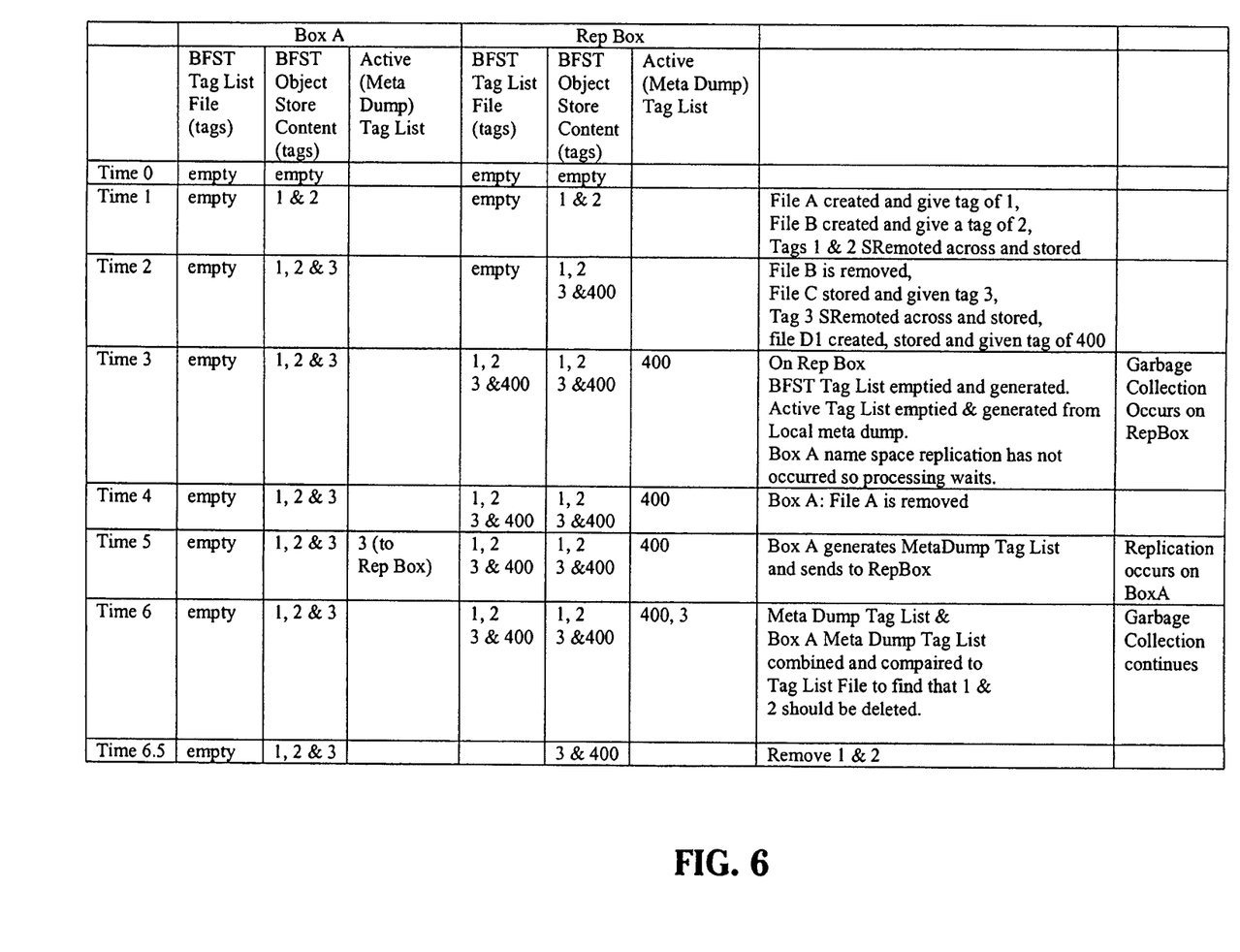
FIG. 6 are another table illustrating another example of data reclamation in accordance with the systems and methods described herein.

FIGS. 5 and 6 are tables that illustrate one example of the systems and methods described herein. Referring now to FIG. 5, in various embodiments, at a time 0, the BFST TagListFile and the BFST LocalStoreList may be empty. At a time 1, a file "A" may be created and given a tag of "1". A file "B" may also be created and given a tag of "2". In some embodiments, the tags may be stored in the BFST Object Store. The BFST Object Store may be a list of all objects stored that may be used to determine which files may be needed. In some embodiments, from time to time the BFST Object Store may be emptied. At a time 2 File B may be removed and file "C" may be stored and given the tag 3. Tag 3 may be added to the BFST Object Store, which, contains 1, 2 and 3 at time 2.

A garbage collection might occur at a time 3. During the garbage collection the BFST Tag List File may be emptied and the BFST Object Store may be copied into the BFST TagListFile. Additionally, the Active Tag List may be generated. The Active Tag List and the BFST Tag List File may be compared and tag 2 and its associated data may be deleted based on the compare. Accordingly, the BFST Tag List may store the tags from the BFST Object Store List during garbage collections. Additionally, during a garbage collection the Active Tag List may be generated. In some embodiments, the Active Tag List may include a list of tags that are needed. In other words, tags that should not be deleted. The tags on this list still reside in the name space. By comparing the tags in the Active Tag List to tags in the BFST Tag List the tags that may be deleted can be determined. As illustrated in the example of FIG. 5, tag 2 may be deleted. Accordingly, after the garbage collection, at time 3.5, the BFST Object Store may contain 1 and 3, rather than 1, 2 and 3.

At a time 4, a file "D" might be created and given the tag "4" and a file E might be created and given a tag "5". Accordingly, at time 4 the BFST Object Store may contain 1, 3, 4 and 5. Additionally, file A might be removed from the system. At a time 5 another garbage collection might occur. The BFST Object Store may be copied to the BFST Tag List File. (THe BFST Tag List File may be deleted prior to the copy.) Additionally, the Active Tag List may be generated to determine which files might still be needed. This file may then be compared with the BFST Tag List File and unneeded tags or data might be deleted based on the compare. As illustrated in FIG. 5, after the garbage collection, at time 5.5, the BFST Object Store might contain tags 3, 4 and 5. These are the tags that are still stored in the data storage system. It will be understood that some embodiments might use different lists to determine which tags might be deleted, which might continue to be stored, etc.

FIG. 6 is a table that illustrates one example of the systems and methods described herein involving the replication of a destination box. For the example illustrated in FIG. 6, the "RepBox" may be a destination for backups and a replication target. "BoxA" may be a destination for backups that may also be replicated to the RepBox.

As illustrated in FIG. 6, the functionality of BoxA may be similar to the systems and methods described with respect to FIG. 5. In the example of BoxA, however, as items are successfully sent to the replication destination, they might be added to the BFST Object Store on the remote box, which, in some embodiments, might list the tags or files that are transmitted to the replication destination. For example, see the table entries from time 1 and time 2 in FIG. 6.

Additionally, as illustrated in FIG. 6, in various embodiments, when a name space replication occurs, the BFST Object Store on BoxA may be sent to the RepBox. In some embodiments, the Active Tag List might also be transmitted to the RepBox. As discussed above, in various embodiments, the Active Tag List may be a list of tags that should be kept. In some examples, the Tag Lists on the RepBox might be referred to as Remote Tag Lists.

In various embodiments, as illustrated by the example of FIG. 6, on the RepBox, when a garbage collection occurs, the RepBox may add the BFST Tag List File at BoxA and all RepBox Active Tag List file entries to the RepBox BFST Tag List File. These files can be compared at the RepBox with the Active Tag List at the RepBox, for example, to determine which tags and data associated with the tags is needed.

Similar to the example of FIG. 5, at the RepBox, the BFST Tag List File may be compared to the Active Tag List File. In various embodiments, anything in the BFST Tag List File that is not in the Active Tag List may be deleted.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more," or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for controlling a data de-duplication system to perform garbage collection, the method comprising:
    accessing a first list of tags, the first list of tags being a list of active tags associated with a data object stored in a data de-duplication system object store, where accessing the first list of tags comprises acquiring information about tags associated with active file namespaces associated with the de-duplication system by acquiring information from active namespace snapshot metadata acquired during a replication performed by the de-duplication system;
    accessing a second list of tags, the second list of tags being a list of tags in the data de-duplication system object store, where accessing the second list of tags comprises acquiring information about tags actually present in the data de-duplication system object store by one or more of, accessing the object store via an object store Application Programming Interface (API) that is configured to provide the second list, and accessing a real-time up-to-date list of tags maintained by the data de-duplication system; and
    performing garbage collection in the de-duplication system by reclaiming space in the data de-duplication object store by selectively deleting a tag present in the data de-duplication object store upon determining that the tag present in the data de-duplication object store is in the second list of tags but is not in the first list of tags, where deleting the tag comprises one or more of, physically deleting the tag and logically deleting the tag through reference count manipulation including delaying the deleting of the tag present in the data de-duplication system object store for a period of time sufficient to allow a race condition associated with deleting the tag to be resolved.

2. The method of claim 1, comprising generating the first list of tags by acquiring information about tags associated with active file namespaces associated with the de-duplication system.

3. The method of claim 1, comprising controlling the de-duplication system to generate the first list in response to detecting the completion of the replication event.

4. The method of claim 1, comprising generating the second list of tags.

5. The method of claim 4, where generating the second list of tags comprises acquiring information about tags actually present in the data de-duplication system object store.

6. A data storage system comprising:
a data storage device;
a memory configured to store instructions;
a processor configured to read the memory and execute the instructions, the instructions configured to cause the processor to:
   generate a first list of tags, the first list of tags being a list of active tags associated with a data object stored in a data de-duplication system object store, where generating the first list of tags comprises acquiring information about tags associated with active file namespaces associated with the de-duplication system by acquiring information from active namespace snapshot metadata acquired during a replication performed by the de-duplication system;
   generate a second list of tags, the second list of tags being a list of tags in the data de-duplication system object store, where generating the second list of tags comprises acquiring information about tags actually present in the data de-duplication system object store by one or more of, accessing the object store via an object store Application Programming Interface (API) that is configured to provide the second list, and accessing a real-time up-to-date list of tags maintained by the data de-duplication system; and
   reclaim space in the data de-duplication object store by selectively deleting a tag present in the data de-duplication object store upon determining that the tag present in the data de-duplication object store is in the second list of tags but is not in the first list of tags, where deleting the tag comprises one or more of, physically deleting the tag, and logically deleting the tag through reference count manipulation, and delaying the deleting of the tag present in the data de-duplication object store for a period of time sufficient to allow a race condition associated with deleting the tag to be resolved.

7. A non-transitory computer-readable medium storing computer executable instructions that when executed by a computer cause the computer to perform a method, the method comprising:
accessing a list of storage tags, where the list of storage tags are tags stored in an object store of a data de-duplication system, where accessing the storage list of tags comprises acquiring information about tags actually present in the data de-duplication system object store by one or more of, accessing the object store via an object store Application Programming Interface (API) that is configured to provide the second list, and accessing a real-time up-to-date list of tags maintained by the data de-duplication system;
accessing a list of active tags, where the list of active tags are tags stored in the object store with at least one active reference, where accessing the active list of tags comprises acquiring information about tags associated with active file namespaces associated with the de-duplication system by acquiring information from active namespace snapshot metadata acquired during a replication performed by the de-duplication system; and
performing garbage collection by deleting a tag in the object store in response to determining that the tag is in the list of storage tags but is not in the list of active tags, where deleting the tag comprises one or more of, physically deleting the tag and logically deleting the tag through reference count manipulation and delaying the deleting of the tag in the object store for a period of time sufficient to allow a race condition associated with deleting the tag to be resolved.

8. The non-transitory computer-readable medium of claim 7, comprising:
Preventing the race condition associated with deleting the tag by delaying the deleting for a pre-determined period of time that is sufficient to determine whether incoming data includes a reference to the tag.

9. The non-transitory computer-readable medium of claim 7, comprising:
generating the list of active tags by acquiring information about tags associated with active file namespaces associated with the de-duplication system; and
generating the second list of tags by acquiring information about tags actually present in the object store.

10. The non-transitory computer-readable medium of claim 9, where acquiring information about tags associated with active file namespaces includes acquiring information from active namespace snapshot metadata, and where acquiring information about tags actually present in the object store includes accessing a real-time up-to-date list of tags maintained by the data de-duplication system.

* * * * *

UNITED STATES PATENT AND TRADEMARK OFFICE
CERTIFICATE OF CORRECTION

PATENT NO. : 8,650,228 B2  
APPLICATION NO. : 12/102590  
DATED : February 11, 2014  
INVENTOR(S) : Wideman et al.

Page 1 of 1

It is certified that error appears in the above-identified patent and that said Letters Patent is hereby corrected as shown below:

In the Claims:

Column 14, line 34, delete "Preventing" and insert --preventing--.

Signed and Sealed this  
Seventh Day of October, 2014

Michelle K. Lee  
*Deputy Director of the United States Patent and Trademark Office*